United States Patent [19]

Betts

[11] Patent Number: 5,430,952
[45] Date of Patent: Jul. 11, 1995

[54] TAPE MEASURE AND ACCESSORY COMBINATIONS

[75] Inventor: David Betts, Sheffield, England

[73] Assignee: S. Betts & Sons Limited, Sheffield, England

[21] Appl. No.: 211,195
[22] PCT Filed: Jul. 12, 1993
[86] PCT No.: PCT/GB93/01450
§ 371 Date: Mar. 17, 1994
§ 102(e) Date: Mar. 17, 1994
[87] PCT Pub. No.: WO94/02799
PCT Pub. Date: Feb. 3, 1994

[30] Foreign Application Priority Data

Jul. 23, 1992 [GB] United Kingdom ............... 92156751

[51] Int. Cl.⁶ ............................................. G01B 3/10
[52] U.S. Cl. ........................................ 33/760; 33/768; 7/163
[58] Field of Search ................. 33/759, 760, 761, 768, 33/770; 7/163, 164

[56] References Cited

U.S. PATENT DOCUMENTS

| | | | |
|---|---|---|---|
| 140,227 | 6/1873 | Stubbings | 33/761 |
| 2,992,487 | 7/1961 | Miller | 33/760 |
| 4,023,277 | 5/1977 | Fizer | |
| 4,438,538 | 3/1984 | Larsen | |
| 4,516,325 | 5/1985 | Cohen et al. | 33/760 |
| 4,766,673 | 8/1988 | Bolson | |
| 4,786,010 | 11/1988 | Dynan | 33/760 X |
| 4,794,692 | 1/1989 | Wang | |
| 5,206,965 | 5/1993 | Rowley | 7/119 |
| 5,295,308 | 3/1994 | Stevens et al. | 33/768 X |

FOREIGN PATENT DOCUMENTS

| | | |
|---|---|---|
| 865978 | 7/1978 | Belgium |
| 943824 | 12/1963 | United Kingdom |
| 2121178 | 12/1983 | United Kingdom |
| 2144842 | 3/1985 | United Kingdom |
| 2229533 | 9/1990 | United Kingdom |

OTHER PUBLICATIONS

Sonin Calcu-Tape+ TM Brochure, 1989.
Trueline TM Measuremark TM Brochure, Brookfield, Mass., Dec. 1992, 2 pages.

*Primary Examiner*—Alvin Wirthlin
*Attorney, Agent, or Firm*—Collard & Roe

[57] ABSTRACT

A tape measure and accessory combination comprises a housing (10), with a retractable tape measure (12) housed therein, which can be extended through a slot (13) in the housing, a blade (15) mounted adjacent the slot so that said blade can use the tape (12) as a straight edge for cutting and scoring. A flashlight bulb (16) is mounted so as to shine along the tape measure when extended, and other accessories can be provided, such as a note surface (21) or pad (120), a pencil (22) or (121), and an angle finder (115) incorporating a bubble vial (116).

5 Claims, 2 Drawing Sheets

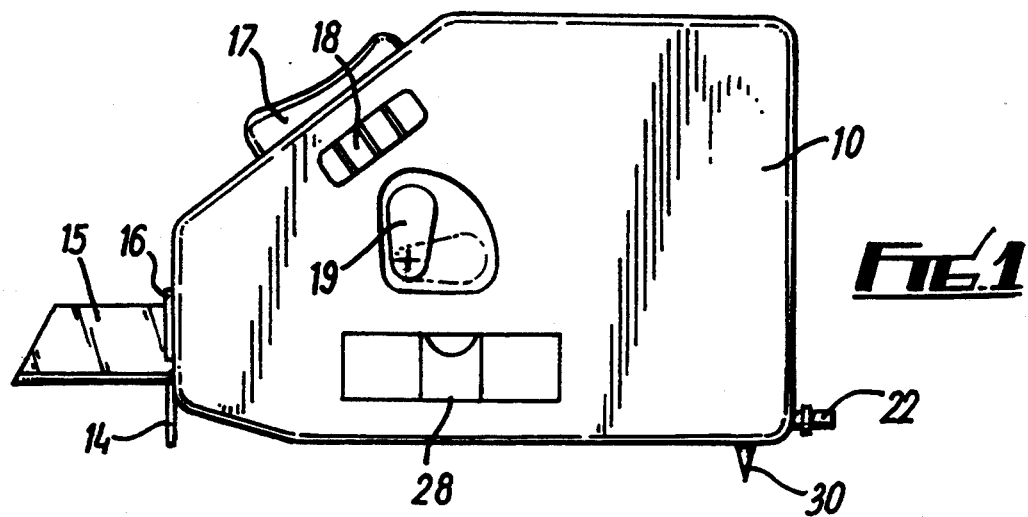
FIG. 1
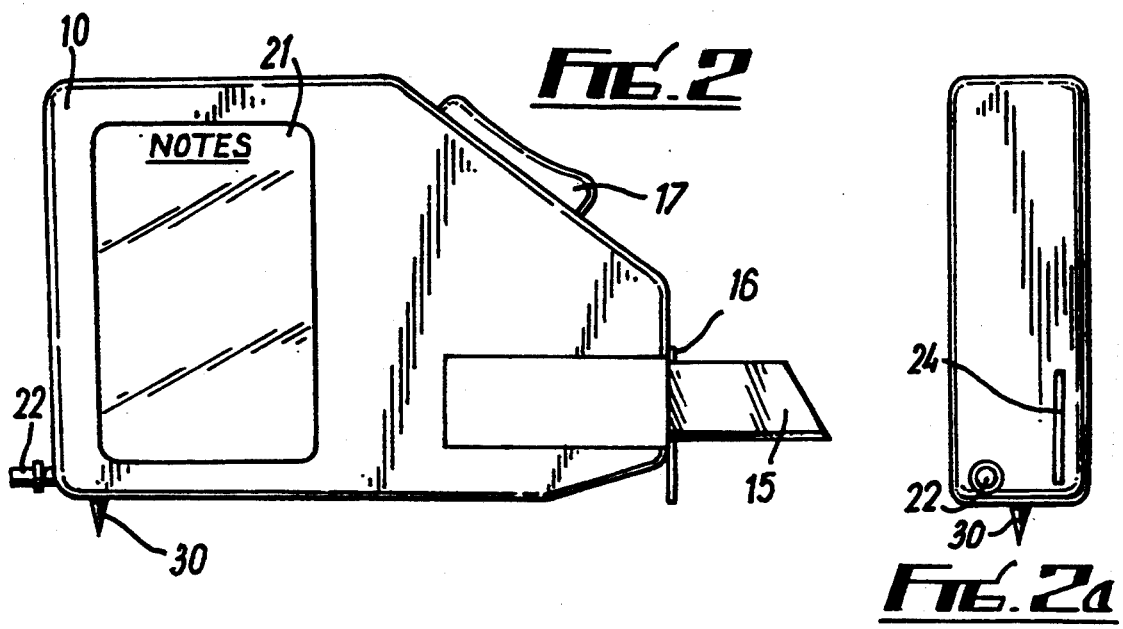
FIG. 2
FIG. 2a
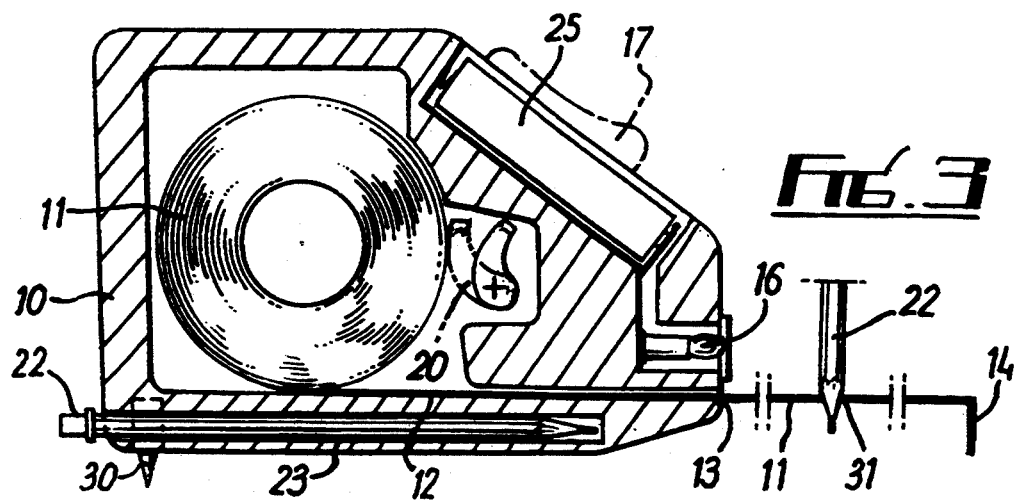
FIG. 3

TAPE MEASURE AND ACCESSORY COMBINATIONS

This invention relates to tape measure and accessory combinations.

Retractable spring-loaded tape measures coiled in a housing from which they can be drawn by pulley on an exposed end tab, and retracted by spring tension on release are well known. Some form of locking device is usually provided to enable the tape to be kept extended during measuring operations.

Such basic tape measures are well known, although there may be variations in the design of the housing, and the details of the retraction and locking systems used.

It is useful to have a number of other facilities available for use alongside the tape measure, without having to search for further items of equipment.

G B 2229533 discloses a tape measure and flashlight combination, FIG. 5 wherein a flashlight is directed to illuminate part of the tape measure when extended.

An object of the invention is to provide a tape measure and accessory combination which combines further accessories with or in the tape measure housing, to extend the versatility and usefulness of the combination.

According to the invention, a tape measure and accessory combination is provided, comprising a retractable tape measure, contained when retracted in a housing, and capable of extension from the housing, and characterised by the provision of at least a fixed or retractable blade, mounted adjacent the tape and positioned to use the tape as a straight edge for cutting or scoring.

The tape measure and accessory combinations may in addition include any one or more of the following features:

a) A holder for a note pad, and a recess, bore or aperture to accommodate a writing instrument, e.g. a pencil which can be inserted into a bore in the housing of the combination;

b) An angle finder, in tile form of a bubble vial mounted in a rotatable boss concentrically mounted within an arcuate scale which is graduated in arcuate measure;

c) A flashlight or battery operated electric lamp mounted so as to illuminate the scale of the tape when extended, so that the tape can be read in conditions of darkness or poor light.

d) A circle or are drawing facility, comprising a spike located in the body of the tape measure housing, suitable for providing a pivot axis, and a pencil holder provided in the tape, preferably near the outer end thereof, so that the required radius can be measured using the tape, and a pencil mounted in the holder, and the assembly rotated about the spike to define a given arc.

Preferably the invention provides a single tool to replace four separate tools, i.e. a straight edge tape measure, pencil and trimming knife.

In a preferred embodiment, the flashlight is mounted adjacent, and directed generally parallel to the tape and cutting blade, so that it shows along the cutting line, instead of illuminating a small portion of the tape from a close, elevated position, as in the specification G B 2229533 mentioned above.

Embodiments of tape measure and accessory combinations according to the invention will now be further described, by way of example, with reference to the accompanying drawings, wherein:

FIG. 1 is a side view of a preferred embodiment of tape measure and accessory combination according to the invention;

FIG. 2 is a side view of the embodiment of FIG. 1 from the side opposite that of FIG. 1;

FIG. 2a is an end view of the embodiment of FIG. 1;

FIG. 3 is a sectional view of the embodiment of FIGS. 1 and 2 showing its internal layout;

Figure 4:
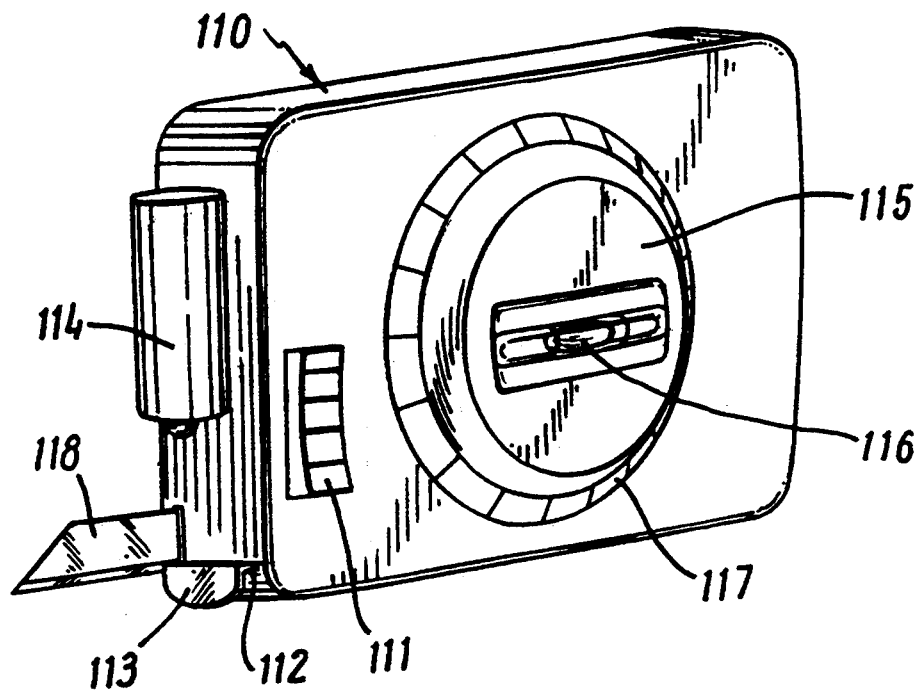
FIG. 4 is a perspective view of a further embodiment of the invention, incorporating a plurality of accessories as an example of the range thereof envisaged by the invention.

Referring first to FIGS. 1, 2 and 3, a tape measure and accessory combination according to the invention comprises a housing 10, enclosing a tape spool 11, with associated rewind spring, and a lead end 12 extending to a slot 13 in an end face of the housing where it is prevented from full retraction by a tab 14 which is too wide to enter slot 13.

A retractable blade 15 is mounted alongside the slot 13, and positioned so that the cutting edge of blade 15 is adjacent the edge of the tape 11, when extended, so that the tape edge can be used as a straight edge in cutting or scoring. Additionally, a flashlight is constituted by a lamp bulb 16 which is mounted so as to direct light along the extended tape, and the cutting line of the blade 15.

A blade retracting and extending switch 17 is mounted on an upper sloped end surface of the housing, and a flashlight on-off switch 18 on one side of the housing (FIG. 1). Also provided is a tape brake or clamp actuator 19, with an associated pressure member 20 within the housing which presses on the tape spool 11 to prevent tape rewind, or extension when actuated, and is disengaged from the spool when the tape is intended to be freely extendable and retractable. A spirit level vial 28 is mounted on one side of the housing, parallel to the bottom face of the housing.

The reverse side of the housing (FIG. 2) carries a note sheet 21, which may be provided with a wipe-clean surface, and a pencil 22 is adapted to be stored in a bore 23 extending from the rear of the housing, below the tape reel. Also in the rear of the housing is a slot 24 to accommodate a plurality of spare blades 15 (e.g. four).

As shown in FIG. 3, most of the internal space of the housing is taken up by the tape spool 11; (which has a retraction spring, not shown, of conventional type); pencil 22 (with eraser tip) is accommodated below the tape reel, and the retractable blade 15 is accommodated in front of it, adjacent the lead end 12 of the tape, as is a battery 25 with associated copper strip contacts to the bulb 16, controlled by switch 18, and consisting of a flashlight disposed to shine along the tape rather than down onto it. An aperture 31 is provided in the tape, about 10 cm from the tang 14, to hold the point of pencil 22 when drawing circles using a spike 30 on the base of the housing as an axis. Spike 30 is retractable and provides the center point of rotation when drawing circles and arcs.

Figure 5:
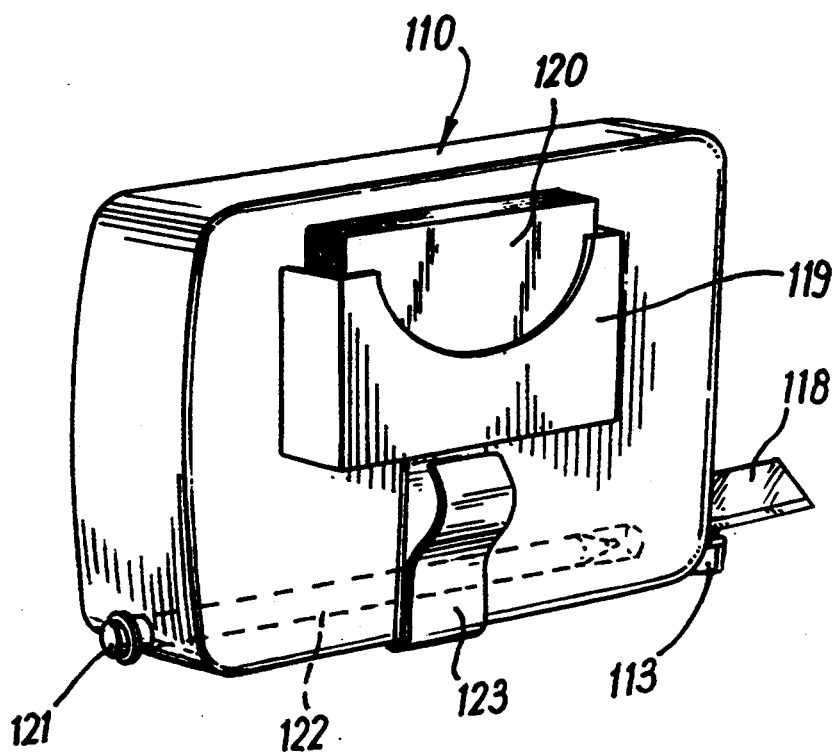
FIG. 5 is a perspective view of the embodiment of FIG. 4 from the side opposite that of FIG. 4

As shown in FIGS. 4 and 5, a retractable tape measure is extendable from a housing 110, into which it can be retracted by a known spring mechanism, and the tape can be locked in an extended state against retraction by the spring, by a locking switch 111. A free end of the tape 112 with a tab 113 is always left extending from the housing 110.

In accordance with the invention, the tape housing 110 is provided with a plurality of accessories. These comprise:

a) A lamp 114, with a miniature bulb, operated by compact batteries within housing 110 and directed to illuminate the upper surface of the tape 112 when extended, so that the scale of measurement can be read even in darkness; (shown in FIG. 4).

b) An angle finder, for finding the inclination of run-level surfaces, either for purposes of correction, or survey, comprising a rotatable boss 115 incorporating a bubble vial 116; so that when the housing has been placed on a surface, and the bubble vial 116 levelled, the inclination can be read from the angular scale 117 (shown in FIG. 4).

c) A retractable blade 118, mounted alongside the tape 112, which can be extended to use the tape 112 after measurement as a straight edge for scoring or cutting. This can be of particular use in measuring and cutting any sort of card or board, including cardboard used in crafts, and plasterboard as used In the building trade (shown in FIG. 4).

d) A plastics pocket 119 formed on a back surface of the housing (opposite to the angle finder) which contains or can contain a small pad 120 of gummed edge paper, of the kind used for note taking. In addition a pencil 121 is lodged in a tunnel 122 (shown by dashed lines and this can be withdrawn, used to write on the pad, and returned, as required (shown in FIG. 3).

A clip 123 is also provided, to clip the housing to a user's pocket or belt. This feature is however well known.

With one or more accessories according to the invention, a tape measure can be optimised for a particular application, and provide a unique product for promotional purposes.

A wafer type calculator (of the kind commonly referred to as a "Credit Card Calculator"), not shown, may be adhered to one of the faces of the housing 10 or 110.

By providing a single tool with several accessories, preferably at least a straight edge, tape measure, pencil and trimming knife will be combined into a single tool.

Others may include a spirit level, large radius compasses, inclinometer, flash light and note pad.

This combined tool is more convenient to use than separate tools, which all must be separately located and martialled, with consequent time saving and one or more tools are less likely to be misplaced or lost than with separate tools.

What is claimed is:

1. A tape measure and accessory combination comprising:
    a housing having two opposite sides, a top, a bottom a front and a back;
    an extensible and retractable tape measure having two opposite ends and contained in said housing;
    an orifice formed in the front of said housing to permit one end of said tape measure to extend therefrom; and,
    a blade having a cutting edge and mounted in said housing, said blade extending alongside said tape measure such that said cutting edge extends parallel to and at the same level of said tape measure when said tape measure is extended.

2. The combination according to claim 1, further comprising a holder for a note pad disposed on one of the sides of said housing, and a bore in said housing for releasably receiving and holding a writing instrument (22,121).

3. The combination according to claim 1, further comprising an angle finder mounted on one of the sides of said housing, said angle finder comprising an angular scale and having a bubble vial mounted within the angular scale.

4. The combination according to claim 1, further comprising a circle and arc drawing means, said circle and arc drawing means including a retractable spike provided on the bottom of said housing, and a pencil holder near the extended end of said tape measure, so that the tape can be used to measure a desired radius, and said housing is rotated on said spike to draw the desired arc or circle.

5. The combination according to claim 1, wherein said housing further comprises a battery operated electric lamp mounted in the front of said housing adjacent to and directed substantially parallel to said tape measure and to said blade.

* * * * *